United States Patent Office 3,383,422
Patented May 14, 1968

3,383,422
ALKOXYCAMPHANE AND CAMPHOR PROCESS
Bernard J. Kane, Atlantic Beach, and Rudolph M. Albert, Jr., Jacksonville, Fla., assignors, by mesne assignments, to SCM Corporation, New York, N.Y., a corporation of New York
No Drawing. Filed Jan. 27, 1965, Ser. No. 428,565
3 Claims. (Cl. 260—611)

ABSTRACT OF THE DISCLOSURE

A process for preparing 2-lower alkoxycamphanes which comprises contacting at a temperature of from about 10° C. to about 125° C. at from about atmospheric pressure to about 100 p.s.i.g., a liquid comprising a lower aliphatic alcohol having dissolved therein a hydrocarbon selected from the group consisting of camphene, tricyclene and mixtures thereof with a substantially water-free, solid cation exchange resin in the hydrogen form until a solution comprising a 2-lower alkoxycamphane dissolved in said lower aliphatic alcohol is formed.

2-lower alkoxycamphanes are valuable intermediates in the synthesis and production of camphor and a process for preparing camphor is also described. The invention for preparing camphor is also described. The invention is advantageous in that the 2-lower alkoxy camphanes can be used to make camphor directly without the time-consuming purification steps required by previously known processes.

---

The present invention relates to lower alkoxycamphanes and camphor, and more particularly to novel economical processes for preparing these compounds.

It has been proposed heretofore by Kitajima and Noguchi in the Reports of the Association of Camphor Industrial Engineering, No. 21, p. 188, published in Japan in 1956 and abstracted in Chem. Abstracts, vol. 53, col. 18976 (f), published in 1959, to react camphene and a stoichiometric excess of methanol in the presence of liquid sulfuric acid (which catalyzes the reaction) to form an acid-containing reaction mixture consisting of (among other things) 2-methoxycamphane, sulfuric acid and methanol. The 2-methoxycamphane is separated from the reaction mixture in crude form and oxidized to camphor with a 66% nitric acid solution.

However, the above described process has certain disadvantages in that excessive quantities of methanol (e.g., up to ten times the theoretical stoichiometric requirement) are consumed. Such excessive methanol consumption is due to the tendency of methanol to enter into esterification reactions with a portion of the sulfuric acid and to form products such as methyl sulfate and methylsulfuric acid in addition to the 2-methoxycamphane. The consumption of methanol renders the process economically unattractive and results in the production of camphor at prohibitive cost. Additionally the separation of the 2-methoxycamphane from the reaction mixture is cumbersome and time-consuming in that a neutralization step is required (to neutralize the sulfuric acid and methyl sulfuric acid to prevent degradation of a portion of the 2-methoxycamphane) prior to the separation step. Also, the above-described process requires that expensive equipment be employed (due to the corrosiveness of the sulfuric acid). Finally, the 2-methoxycamphane product is obtained in crude form and the oxidation of this crude product with nitric acid to produce camphor results in excessive consumption of nitric acid and in a relatively crude, impure camphor product.

The present invention provides a novel process for preparing 2-lower alkoxycamphanes (including 2-methoxycamphane) and also provides an improved process for the manufacture of camphor, whereby 2-lower alkoxycamphanes may be readily and directly obtained in practically pure form in alcohol solution as intermediates, and directly oxidized to camphor, thus overcoming the disadvantages of the prior art processes and providing a simple, economical process for the manufacture of camphor. Novel 2-lower alkoxycamphanes which may be prepared by the processes of this invention are disclosed in U.S. Patent application Ser. No. 428,382, now U.S. Patent No. 3,354,225 filed simultaneously herewith Jan. 22, 1965 and assigned to the same assignee.

It is one object of the present invention to provide a novel economical process for preparing lower alkoxycamphanes.

It is another object of the present invention to provide a novel, improved process for the economical manufacture of camphor.

Further objects and advantages of the present invention will become apparent from the following description and the appended claims.

In accordance with the present invention it has been found possible to economically prepare 2-lower alkoxycamphanes by a process which comprises contacting a liquid comprising a lower aliphatic alcohol having dissolved therein a hydrocarbon selected from the group consisting of camphene, tricyclene and mixtures thereof (sometimes hereinafter referred to for convenience of description as the hydrocarbon) with a substantially water-free solid cation exchange resin in the hydrogen form until a 2-lower alkoxycamphane is formed. During the contact of the liquid with the cation exchange (sometimes hereinafter referred to as the solid catalyst) a reaction takes place between a portion or all of the hydrocarbon and a portion of the lower aliphatic alcohol thereby forming a reaction liquid comprising (1) a lower aliphatic alcohol, (2) a 2-lower alkoxycamphane (in which the number of carbon atoms in the alkoxy group corresponds to the number of carbon atoms in the lower aliphatic alcohol molecule). The 2-lower alkoxycamphane, which is dissolved in the lower aliphatic alcohol and can be recovered therefrom by distilling off the alcohol by conventional distillation procedures, and the alcohol can subsequently be reused in the process of this invention to prepare additional 2-lower alkoxycamphane. In certain hereinafter defined embodiments of this invention the reaction liquid, after contact with the catalyst may contain minor amounts of unreacted hydrocarbon. Under these circumstances the unreacted hydrocarbon and alcohol are distilled (from the 2-lower alkoxycamphane) and both the alcohol and the hydrocarbon can be reused to contact the solid catalyst and to form additional quantities of 2-lower alkoxycamphane.

Contact of the liquid with the cation exchange resin catalyst, which consists of solid beads or particles of the resin in the hydrogen form, can be effected in a variety of ways. For example, the cation exchange resin can be added to the starting liquid and then removed therefrom (when from at least a portion to substantially all of the hydrocarbon has reacted with a portion of the lower aliphatic alcohol to form a 2-lower alkoxycamphane) by filtration, centrifugation and the like, or the cation exchange resin particles can be suspended in a moving stream of the starting liquid in the form of a fluidized bed and subsequently removed from the reaction liquid, or the starting liquid can be passed through a fixed bed of the cation exchange resin. The latter procedure employing the fixed catalyst bed is preferred since it enables accurate, efficient control of (1) the volume of the starting liquid, (2) the contact time, and (3) rate of contact of such liquid with the cation exchange resin.

When a fixed bed of the catalyst is employed the movement of the liquid through the bed may be horizontal, downward or upward. From the standpoint of simplicity of operation, it may sometimes be desirable to permit the liquid to flow downwardly through a fixed bed of resin beads although this is not necessarily the most efficient procedure. Due to the tendency of the catalyst particles to undergo compaction, it is preferred that the movement of the liquid through the bed be upward.

The liquid comprising the lower aliphatic alcohol-hydrocarbon solution may be contacted with the solid catalyst under a wide range of temperatures as long as liquid phase conditions are maintained during the contact between the liquid and the catalyst. Generally, in view of the critical temperatures and the vapor pressures of lower aliphatic alcohol, as well as the tendency of cation exchange resins to undergo softening at elevated temperatures, contact between the liquid and the catalyst can be advantageously effected at a temperature in the range of from about 10° C. to about 125° C. and at a pressure in the range of from atmospheric pressure to about 100 p.s.i.g., the higher temperatures corresponding to the higher pressures, thus maintaining liquid phase conditions in the process. If temperatures below about 10° C. are employed, uneconomical conversion of hydrocarbon to 2-lower alkoxycamphane will result due to the limited solubility of the hydrocarbon in the lower aliphatic alcohols at such temperatures. If temperatures above about 125° C. are employed there is danger of loss of efficiency of the catalyst due to changes in the geometric configuration of the particles thereof due to the aforementioned tendency of the catalyst to soften at higher temperatures. Also, above such temperatures expensive pressure-resistant equipment must be employed.

From the standpoint of simplicity and economy of operation it has been found generally advantageous to effect contact between the starting liquid and the catalyst at substantially atmospheric pressure and at a temperature in the range of from about 20° to about 70° C., preferably from about 30° to about 60° C., the particular temperature employed depending to some extent upon the boiling point of the particularr lower aliphatic alcohol employed. Within the preferred temperature range maximum hydrocarbon conversion is attained at maximum economy of operation.

As previously noted the starting liquid is contacted with a catalyst until a 2-lower alkoxycamphane is formed. The contact time will vary depending upon a number of factors (hereinafter defined) such as for example, the temperature at which the contact is effected, and the method of contact (e.g., whether or not a fixed bed is used), the concentration of the hydrocarbon dissolved in the lower aliphatic alcohol, the volume of the starting liquid and the amount or volume of the solid catalyst. When saturated solutions of the hydrocarbon and lower aliphatic alcohol are employed the contact time of the liquid and the catalyst will be longer than when more diluted solutions are employed, provided the same volume of catalyst is used. Stated differently, the contact time of the liquid with the catalyst will vary inversely with the concentration of the hydrocarbon dissolved in the lower aliphatic alcohol at a particular temperature at a particular volume of catalyst when more concentrated solutions are employed. The conversion-reaction of hydrocarbon to 2-lower alkoxycamphane is slightly but significantly exothermic. When higher temperatures are employed the contact time can be shortened.

The amount or volume of catalyst contacted by the liquid may also be varied considerably depending to a great extent upon the concentration of hydrocarbon in the liquid. Generally, 1 kilogram of liquid can be contacted with a bulk or volume of from about 2 to about 15 liters of solvent wetted catalyst particles (including void spaces between the particles), the larger volume of catalyst particles generally corresponding to the higher concentrations of hydrocarbon within the ranges hereinafter defined.

The process of this invention can be practiced in a batch or a continuous manner and continuous embodiments, where a liquid is continuously contacted with a fixed bed of catalyst results in a rapid, economical production rate and are preferred.

The lower aliphatic alcohol in the starting liquid employed in the processes of this invention will depend upon the 2-lower alkoxycamphane which it is desired to prepare. Generally the 2-lower alkoxycamphane is characterized in having from about 1 to about 8 carbon atoms in the alkoxy group. Thus any liquid lower aliphatic alcohol having from 1 to about 8 carbon atoms in a straight branched or cyclic chain may be employed. However, preferred alcohols are monohydroxy alcohols containing from about 1 to about 4 carbon atoms and include, for example, methyl, ethyl, n-propyl, isopropyl, n-butyl, sec-butyl and t-butyl alcohols, although dihydroxy alcohols such as ethylene and propylene glycol may also be employed. Since, as will be hereinafter evident, the compound 2-methoxycamphane can be obtained readily, directly and economically in pure form and is a preferred intermediate (due to its ease of oxidation) in processes for the manufacture of camphor, a particularly preferred product of the processes of this invention is 2-methoxycamphane and the preferred lower aliphatic alcohol is necessarily methyl alcohol.

As noted hereinbefore, the liquid which is contacted with the solid catalyst in the process of this invention comprises a solution consisting essentially of the hydrocarbon isomers of camphene, tricyclene or mixtures thereof dissolved in any one of the above-described lower aliphatic alcohols. Upon contact of the liquid with the catalyst a portion or all of the hydrocarbons in the liquid reacts exothermically with a portion of the alcohol to form a 2-lower alkoxycamphane. The amount of hydrocarbon present in the starting liquid is limited generally only by the solubility of the hydrocarbon in the particular lower aliphatic alcohol and therefore, secondarily, the particular temperature which it is desired to employ. Generally, however, the liquid can comprise a saturated solution of one or more of the hydrocarbons in a lower aliphatic alcohol. It has been found generally preferable, however, to employ liquids comprising solutions having a hydrocarbon concentration of from about 0.1 to about 0.5 mol of hydrocarbon per mol of lower aliphatic alcohol. If liquids containing less than about 0.1 mol of hydrocarbon per mol of alcohol are employed, the amount of product obtained will usually be disadvantageously low. Although hydrocarbon concentrations above 0.5 mol of hydrocarbon per mol of lower aliphatic alcohol may sometimes be employed, such concentrations usually require the use of elevated temperatures (temperatures as high as 125° C.) and pressures (pressures up to about 100 p.s.i.g.) in order to ensure solubility of the hydrocarbon in the lower aliphatic alcohol. Particularly preferred hydrocarbon concentrations are from about 0.25 to about 0.35 mol of hydrocarbon per mol of alcohol.

As previously noted the hydrocarbon employed can be either camphene or its isomer, tricyclene or mixtures thereof. When the starting liquid consists of a solution of camphene in the lower aliphatic alcohol the contact time of the liquid and the resin is somewhat shortened due to the more rapid rate of reaction between camphene and the lower aliphatic alcohol during the catalysis. On the other hand, tricyclene which reacts more slowly with the lower aliphatic alcohol usually requires a longer contact time. It has been found particularly advantageous to employ a mixture of camphene and tricyclene dissolved in the lower aliphatic alcohol.

The cation exchange resins with which the aforedescribed liquids are contacted in accordance with the process of this invention may be any of a variety of cation exchange resins so long as such resins are in the hydrogen form. However, it has been found preferable to employ strong cation exchange resins since these are more effective as catalysts than weak cation exchange resins. Stated differently, the strong cation exchange resins in the hydrogen form are more effective catalysts when employed in the process of this invention.

By the term "strong cation exchange resins" is meant a material which will remove metallic cations from aqueous solutions at a pH as low as 2. It should be noted, however, that the cation exchange resins employed in the process of the present invention function as catalysts rather than as cation exchange materials and their catalytic activity does not depend upon the occurrence of an ion exchange process during or after catalysis. The strong cation exchange resins are characterized by water insolubility. They are electrolytes having an enormous non-diffusable anion and a simple diffusable cation. Cation exchange resins which can be employed in the process of this invention include, for example, those cation exchange resins described in U.S. Patents 2,340,111, 2,366,007 and 2,366,008. It is preferred that the cation be a sulfonic acid group, which includes nuclear sulfonic acid groups as well as alkylene sulfonic acid groups. Examples of strong sulfonic acid cation exchange resins include the water insoluble phenolic methylene sulfonic resins such as those obtained by reacting phenol, formaldehyde and a methylene sulfonic acid or an alkali metal sulfite, for example, the resins described in U.S. Patent 2,477,328. Other preferred strong cation exchange resins are the water insoluble vinyl aromatic polymer-containing nuclear sulfonic acid groups such as those described in U.S. Patent 2,366,007 hereinbefore referred to.

One of the preferred cation exchange resins which may be employed (in the hydrogen form) in the process of this invention is the water insoluble aromatic hydrocarbon copolymer solid of a monovinyl hydrocarbon (e.g., styrene) and a polyvinyl aromatic hydrocarbon (e.g., divinyl benzene) containing a plurality of nuclear sulfonic acid groups. the preparation of such resins and the chemical constitution thereof is described in U.S. Patents 2,466,675 and 3,037,052. Generally, cation exchange materials which have a titration curve similar to that shown in FIG. 1 on p. 88 of "Analytical Chemistry," vol. 21, 1949, are satisfactory.

The cation exchange resins are preferably composed of particles which have a bead shape and which are porous and the more highly porous materials are particularly preferred. Since catalytic activity of these materials does not depend upon the occurrence of an ion exchange process during catalysis the activity of these materials will decrease if the hydrogen ions are replaced by other cations. Accordingly, it is desirable that cations other than hydrogen ions be eliminated insofar as possible from the liquids employed in the process of this invention.

The size and shape of the particles of cation exchange resins employed is preferably such that substantially all of the particles are spherical and will pass through a 16 mesh U.S. Standard Screen and substantially all of the particles will be retained on a 60 mesh U.S. Standard Screen. Particles of such size will readily permit the flow of the liquid through the catalyst bed, permitting uninterrupted practice of the process. The cation exchange resins should be substantially water-free, that is, they should contain less than 1% by weight of moisture. Specific examples of commercially available cation exchange resins which may be advantageously employed in the process of this invention include the material designated as "Dowex" 50, a trademark of and sold commercially by the Dow Chemical Company, and "Amberlyst" 15, a trademark of and sold commercially by the Rohm & Haas Company.

In a flow operation after contact of the strong cation exchange resin in the hydrogen form with the starting liquid (hereinafter sometimes referred to as the affluent), a reaction liquid (sometimes hereinafter referred to as the effluent) containing a 2-lower alkoxycamphane dissolved in a lower aliphatic alcohol is obtained. Often the effluent will also contain small amounts of unreacted hydrocarbon, e.g., camphene, tricyclene or mixtures thereof. The lower aliphatic alcohol and unreacted hydrocarbon can be removed or stripped from the 2-lower alkoxycamphane by conventional methods such as, for example, by fractional distillation under reflux conditions to obtain a substantially pure 2-lower alkoxycamphane distilland. The recovered alkanol can then be recycled, mixed with fresh lower aliphatic alcohol and hydrocarbon and contacted with the same fresh cation exchange resin in the hydrogen form to produce additional amounts of 2-lower alkoxycamphane.

In contrast to the prior art processes, where the solution of hydrocarbon in the lower aliphatic alcohol is reacted in the presence of sulfuric acid to obtain a crude 2-lower alkoxycamphane, the process of the present invention produces a substantially pure product in which a substantial portion of the hydrocarbon reacted is recovered (when sufficient alkanol or alcohol is employed) in the form of a 2-lower alkoxycamphane. Upon oxidation of the 2-lower alkoxycamphane, produced by the process above described, to camphor by means of an oxidizing agent it is possible to readily obtain substantially pure camphor.

In accordance with a preferred embodiment of this invention a solution comprising a lower aliphatic alcohol having dissolved therein from about 0.25 mol to about 0.35 mol of camphene, tricyclene or a mixture of these hydrocarbons is contacted with a fixed bed of a strong cation exchange resin in the hydrogen form such as, for example, "Amberlyst" 15 at a temperature in the range of from about 30° C. to about 60° C. at substantially atmospheric pressure.

The fixed bed of cation exchange resin or catalyst is preferably enclosed in a cylinder containing the catalyst particles through which the liquid is passed either by gravity or pumping. The catalyst, prior to contact with the liquid, is wetted with the same lower aliphatic alcohol employed as the solvent of the starting liquid. The volume of catalyst required will generally vary according to the concentration of the hydrocarbon in the liquid for a single-pass operation. Thus, by way of example, when the liquid comprises from about 0.25 to about 0.35 mol of hydrocarbon per mol of lower aliphatic alcohol, a kilogram of liquid will require a volume of catalyst which has been wetted and swollen in an alkanol in the range of from about 2.5 to about 15 liters of resin to convert the hydrocarbon to the 2-lower alkoxycamphane in one pass at a temperature of from about 20° C. to about 70° C. On the other hand when the concentration of the hydrocarbon and the liquid is from about 0.36 to about 0.50 or more per mole of lower aliphatic alcohol, one kilogram of such solution will require a volume of from about 8 to about 15 liters of catalyst. Stated differently, it is possible to pass, for example, 1 kilogram of a solution consisting of 1 gram-mole of hydrocarbon dissolved in 4-gram-moles of lower aliphatic alcohol through a fixed bed containing 2.5 liters of catalyst to substantially effect the complete conversion of the hydrocarbon to a 2-lower alkoxycamphane in one pass through the bed. The contact time under these conditions may vary in the range of from about 30 minutes to about 90 minutes and substantially complete conversion of the hydrocarbon is effected between about 75 minutes and 90 minutes. Alternatively, a liquid consisting of 1 gram-mole of hydrocarbon dissolved in 2-gram-moles of lower aliphatic alcohol can be suitably contacted with a fixed bed containing a volume of about 4 liters of catalyst. Under such conditions all or substantially all of the hydrocarbon is converted to 2-methoxycamphane in a single pass through the fixed bed within 60 minutes or 70 minutes. Stated differently, the starting liquid or solution within the concentration ranges hereinbefore defined may be contacted with a fixed bed of strong cation exchange resin at a rate such that one gram of solution will contact from about 2.5 ml. up to about 14.5 ml. of the cation exchange resin per minute, the higher resin volumes corresponding to the more highly concentrated solutions. By so proceeding, substantially all of the hydrocarbon will be converted to a lower alkoxycamphane during a single pass through the catalyst bed.

In a particularly preferred embodiment of a process of this invention it is possible to prepare 2-methoxycamphane by contacting a liquid consisting essentially of a methanol solution containing from about 0.25 to about 0.35 mol of a hydrocarbon selected from the group consisting of camphene, tricyclene and mixtures thereof, per mol of methanol with a fixed bed of the above defined volume range of a substanitally water-free solid cation exchange resin in the hydrogen form at the previously described rate thereby forming a reaction liquid consisting substantially of 2-methoxycamphane, a minor amount of unreacted hydrocarbon dissolved in methanol; the unreacted hydrocarbon and methanol are then distilled from the 2-methoxycamphane. The 2-methoxycamphane so obtained can then be readily oxidized with an oxidizing agent, for example, $NO_2$ and water, nitric acid or a mixture of nitric and sulfuric acid to form camphor, and the camphor obtained can then be dissolved in a liquid hydrocarbon and crystallized therefrom.

The following specific examples are intended to illustrate the invention and not to limit the scope thereof, parts and percentages being by weight unless otherwise specified.

EXAMPLE 1

To a stainless steel mixing tank equipped with a mechanical stirrer, a pump, and connected by means of a tube provided with a flow control valve to the lower end of a vertical cylindrical reactor there was added 9.5 kgs. of methanol and 10 kgs. of a hydrocarbon product consisting substantially of 80 wt. percent of camphene and 20 wt. percent of tricyclene and having a melting point of 45° C. The hydrocarbon product was dissolved in the methanol to provide a liquid solution containing essentially 0.25 mol of hydrocarbon per mol of methanol.

The cylindrical reactor, to which the mixing tank was connected, consisted of a stainless steel tube 4 meters long having an internal diameter of 3.5 centimeters. The reactor was provided with a bottom inlet and an outlet at the top of the tube to collect reaction effluent. The tube contained a fixed amount of catalyst which consisted of methanol-wetted beads of the hydrogen form of a strong cation exchange resin, specifically "Amberlyst" 15, commercially available from Rohm & Haas Company, "Amberlyst" 15 is a nuclear sulfonic acid cation exchange resin based on a styrene-divinyl benzene copolymer and having highly porous ("macroreticulate") structure which is described in Industrial and Engineering Chemistry Product Research and Development, volume 1, No. 1, pp. 140–144 in 1962. The fixed reactor bed was prepared by placing 2300 ml. of substantially dry (containing less than 1% by weight of moisture) nonwetted resin beads in the tube, and wetting the beads by soaking them in 1500 ml. of methanol within the tube after which the beads swelled to a volume of 3700 ml. The bed of resin beads was maintained in fixed position by means of screens at each end of the tube.

The liquid hydrocarbon solution was heated to 60° C. and was pumped upwardly through the reactor bed at a pressure of 0.5 p.s.i.g. measured at the bottom of the reactor over a one-hour period during which time 1370 grams of the methanol-hydrocarbon solution had passed through the bed. The reactor effluent which was at a temperature which varied between 25 and 30° C. was collected, qualitatively analyzed and found to consist of a mixture of 2-methoxycamphane, unreacted hydrocarbon (e.g., camphene-tricyclene) dissolved in methanol. Thereafter the effluent was fractionally distilled at 100 mm. pressure after methanol removal using a 5:1 reflux ratio in a distilling column having the equivalent of about 10 theoretical plates. At the end of the distillation, 669 grams of substantially pure 2-methoxycamphane were obtained as stripped distilland and 163 grams of unreacted hydrocarbon (a camphene-tricyclene mixture) were obtained as the distillate. The quantity of the product obtained represented a conversion of 77% of the hydrocarbon (which had been contacted with the catalyst) to 2-methoxycamphane. The recovered hydrocarbon and recovered methanol were recycled as a solution and used to prepared additional quantities of 2-methoxycamphane along with makeup hydrocarbon-methanol solution to equal the starting concentration of hydrocarbon dissolved in methanol.

The above process was conducted in a continuous manner until all of the liquid including the recycled material had been pumped through the reactor and 12.3 kg. of 2-methoxycamphane was obtained.

EXAMPLE 2

The procedure of Example 1 was repeated except that the starting liquid employed was prepared by dissolving 1 kg. of hydrocarbon in 0.72 kg. of methanol to provide a liquid solution consisting of 0.33 mol of hydrocarbon per mol of methanol. The liquid was heated to 60° C. and a 298 gram portion was pumped upwardly through the fixed bed of catalyst over a one-hour period at a pressure of 0.2 p.s.i.g. measured at the bottom of the reactor. The effluent which had a temperature which varied within 25° to 30° C. was collected and distilled as described in Example 1. Two hundred grams of 2-methoxycamphane were obtained, representing a conversion of 95% of the hydrocarbon (which had been charged through the reactor) to 2-methoxycamphane.

EXAMPLE 3

The procedure of Example 1 was repeated except that the starting liquid employed was prepared by dissolving 1 kg. of hydrocarbon in a .475 kg. of methanol to provide a liquid solution containing 0.5 mol of hydrocarbon per mol of methanol. The liquid was heated to 50° C. and 178 grams thereof were pumped upwardly through the fixed bed of catalyst over a one-hour period at a pressure of 0.1 p.s.i.g. measured at the bottom of the reactor. The effluent liquid which had a temperature which varied between about 25° C. to about 30° C. was collected and fractionally distilled according to the procedure described in Example 1. Two hundred seven grams of substantially pure 2-methoxycamphane were recovered as described in Example 1. The amount of the product obtained represented a conversion of 95% of the hydrocarbon (charged through the reactor) to 2-methoxycamphane.

EXAMPLE 4

The procedure of Example 1 was repeated except that a solution containing 0.25 mol of hydrocarbon dissolved in 1.0 mol of isopropanol was pumped through the reactor bed. A product was obtained at 95% conversion which was identified as 2-isopropoxycamphane.

The above described processes can be practiced in a batch-wise or a continuous manner and the liquid can be passed downwardly through the reactor column thereby eliminating the necessity of pumping. However, to prevent undesirable compaction of the resin bed it has been found more advantageous to pump the materials upwardly through the bed.

Another strong cation exchange resin in hydrogen form which can be advantageously used in the reactor is "Dowex" 50. However, much longer contact times are required when this material is employed. Although it is not known with certainty, it is believed that the lower porosity of the cation exchange resin is responsible for the prolonged contact time required.

The 2-methoxycamphane product obtained from Examples 1 through 3 required no further processing, in contrast to the 2-methoxycamphane obtained by the prior art process which contained sulfuric acid.

EXAMPLE 5

To an oxidation reactor maintained at a temperature between 10° and 15° C. and provide with a mechanical stirrer, there was added 336 grams (2 mols) of 2-methoxycamphane prepared according to the process of Example 1 and 50 grams of distilled water. The materials were agitated and there was added, while agitation was continued, a mixture of gaseous $NO_2$ and 550 cubic centimeters per minute of gaseous oxygen over an 80-minute period. During the reaction 110 grams of methyl nitrite was formed and collected as a distillate. A water layer and an oil layer separted after the reaction was completed and the stirring discontinued. The weight of the water layer had increased from 50 grams (the water initially added) to 82 grams. The oil layer consisted substantially of 406 grams of a camphor-containing product. The water layer was decanted and the camphor-oil layer was dissolved in 200 grams of heptane and washed with 3 100-ml. aliquot portions of water which were removed after the washing and residual $NO_2$ recovered therefrom. The heptane solution was then washed with a 200-ml. aqueous solution of 10% NaOH which had been heated to a temperature of 80° C. A portion of the heptane (50 ml.) was evaporated and 286 grams of camphor crystals were recovered from the solution after it was cooled. It was also found that heptane which had been previously used to crystallize camphor and which contained substantial quantities of contaminants formed in the oxidation of the 2-methoxycamphane to camphor could be employed to obtain a larger quantity of substantially pure, white camphor crystals than the quantity of camphor obtained from fresh, unused heptane.

EXAMPLE 6

Camphor was also prepared by gradually adding 100 grams of 2-methoxycamphane with stirring to a reactor containing a mixture consisting of 55 grams of 95% nitric acid and 29 grams of 98% sulfuric acid. The mixture was stirred for 30 minutes after the addition of the 2-methoxycamphane and 100 grams of heptane were added to the reactor. The stirring was discontinued and the material permitted to separate into an oil layer and an acid layer. The acid layer was decanted and recycled to oxidize additional 2-methoxycamphane. The oil layer was extracted with 3 equal volume aliquots of an aqueous 10% NaOH solution to remove residual acid. The heptane solution was concentrated by evaporation to about 75% of its origional volume and cooled. Crystalline camphor in pure form was obtained from the cooled solvent through the formation of crystals therein.

What is claimed is:
1. A continuous process for preparing a 2-lower alkoxycamphane which comprises
    (A) continuously contacting a liquid, consisting essentially of a lower aliphatic alcohol having dissolved therein from about 0.1 to about 0.5 mol, per mol of said aliphatic alcohol, of a mixture of camphene and tricyclene, with a substantially water-free, solid, strong cation exchange resin containing sulfonic acid groups and in the hydrogen form, at atmospheric pressure and at a temperature in the range of from about 30° C. to about 60° C., thereby continuously forming a reaction liquid comprising a 2-lower alkoxycamphane and a minor amount of said hydrocarbon dissolved in said lower aliphatic alcohol;
    (B) continuously separating said 2-lower alkoxycamphane from said hydrocarbon and said lower aliphatic alcohol by fractional distillation; and
    (C) continuously recovering said hydrocarbon and said lower aliphatic alcohol for re-use in said process.
2. A process as in claim 1 wherein the hydrocarbon is a mixture consisting essentially of 80 weight percent camphene and 20 weight percent tricyclene, the lower aliphatic alcohol is methanol, and the product obtained is 2-methoxycamphane.
3. A continuous process for producing 2-methoxycamphane which comprises the steps of (1) continuously contacting a liquid consisting essentially of methanol having dissolved therein from about 0.25 to about 0.35 mol, per mol of methanol, of a mixture of camphene and tricyclene with a fixed bed of substantially water-free, solid, strong cation exchange resin containing sulfonic acid groups and in the hydrogen form at atmospheric pressure and at a temperature in the range of from about 30° C. to about 60° C. thereby continuously forming a reaction liquid comprising 2-methoxycamphane and minor amounts of camphene and tricyclene in said methanol; continuously separating 2-methoxycamphane from said camphene, tricyclene and said methanol by fractional distillation; continuously recovering said camphene and tricyclene and said methanol for reuse in said process.

References Cited
UNITED STATES PATENTS
2,220,462 11/1940 Sheffield _____ 260—611
3,170,000 2/1965 Verdol _____ 260—614

OTHER REFERENCES
Kitajima et al., Chem. Abst. vol. 53 col. 18976 (f) (1959) QD1A51.

Rohm & Haas Co., Ion Exchange with the Amerlite Resins, p. 10 (1959) copy in GR126.

BERNARD HELFIN, *Primary Examiner.*

LEON ZITVER, *Examiner.*

M. JACOB, *Assistant Examiner.*